US012197651B2

(12) United States Patent
Araújo et al.

(10) Patent No.: US 12,197,651 B2
(45) Date of Patent: Jan. 14, 2025

(54) METHOD AND ARRANGEMENT FOR HANDLING HAPTIC FEEDBACK

(71) Applicant: Telefonaktiebolaget LM Ericsson (publ), Stockholm (SE)

(72) Inventors: José Araújo, Stockholm (SE); Lars Andersson, Solna (SE); Soma Tayamon, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 18/313,969

(22) Filed: May 8, 2023

(65) Prior Publication Data
US 2023/0273685 A1 Aug. 31, 2023

Related U.S. Application Data

(63) Continuation of application No. 17/499,342, filed on Oct. 12, 2021, now Pat. No. 11,675,439, which is a
(Continued)

(51) Int. Cl.
*G06F 3/01* (2006.01)
*A63F 13/28* (2014.01)
(Continued)

(52) U.S. Cl.
CPC .............. *G06F 3/016* (2013.01); *G06F 3/011* (2013.01); *G06F 3/014* (2013.01);
(Continued)

(58) Field of Classification Search
CPC .......... G06F 3/016; G06F 3/011; G06F 3/014; G06F 3/04815; A63F 13/28; A63F 13/57
(Continued)

(56) References Cited

U.S. PATENT DOCUMENTS 9,767,613 B1 * 9/2017 Bedikian ............... G06F 1/1684
10,281,987 B1 5/2019 Yang et al.
(Continued)

FOREIGN PATENT DOCUMENTS

CA 2907516 A1 * 10/2007 ......... A61B 17/1675
CN 103970268 A 8/2014
(Continued)

OTHER PUBLICATIONS

Hettiarachchi Anuruddha, et al., "Annexing Reality: Enabling Opportunistic Use of Everyday Objects as Tangible Proxies in Augmented Reality", Proceedings of the 2016 CHI Conference on Human Factors in Computing Systems, San Jose, California, May 7-12, 2016, pp. 1957-1967.
(Continued)

*Primary Examiner* — Kwin Xie
(74) *Attorney, Agent, or Firm* — Murphy, Bilak & Homiller, PLLC

(57) ABSTRACT

A method, executed at a controller for adapting a virtual object model, and a controller for executing the suggested method, where the method comprises acquiring of a virtual object model of a relevant virtual object and acquiring of at least one real object model of a relevant real object. Matching, according to at least one matching criteria, at least a part of the virtual object model to at least a part of one of the at least one real object model, selecting the best matching real object, and modifying at least a part of the virtual object model with respect to the at least part of the selected real object model.

16 Claims, 7 Drawing Sheets

Related U.S. Application Data continuation of application No. 16/470,783, filed as application No. PCT/EP2016/082183 on Dec. 21, 2016, now Pat. No. 11,204,643.

(51) Int. Cl.
*A63F 13/57* (2014.01)
*G06F 3/04815* (2022.01)

(52) U.S. Cl.
CPC .......... *G06F 3/04815* (2013.01); *A63F 13/28* (2014.09); *A63F 13/57* (2014.09); *A63F 2300/8082* (2013.01)

(58) Field of Classification Search
USPC .................................................. 345/156–169
See application file for complete search history.

(56) References Cited

U.S. PATENT DOCUMENTS

| | | | |
|---|---|---|---|
| 10,353,532 B1 | 7/2019 | Holz et al. | |
| 11,204,643 B2 | 12/2021 | Araújo et al. | |
| 2006/0209019 A1* | 9/2006 | Hu | G06F 3/016 |
| | | | 345/156 |
| 2011/0107270 A1* | 5/2011 | Wang | G16H 20/40 |
| | | | 703/11 |
| 2015/0049083 A1 | 2/2015 | Bidne et al. | |
| 2015/0153835 A1* | 6/2015 | Perez | G06F 3/011 |
| | | | 345/156 |
| 2015/0169176 A1* | 6/2015 | Cohen | G06T 15/20 |
| | | | 715/852 |
| 2016/0054837 A1* | 2/2016 | Stafford | G02B 27/01 |
| | | | 463/33 |
| 2016/0133230 A1 | 5/2016 | Daniels et al. | |
| 2016/0170508 A1 | 6/2016 | Moore et al. | |
| 2016/0239080 A1* | 8/2016 | Marcolina | G06F 1/163 |
| 2016/0253842 A1* | 9/2016 | Shapira | G06T 19/006 |
| | | | 345/633 |
| 2016/0349835 A1 | 12/2016 | Shapira | |
| 2017/0069134 A1 | 3/2017 | Shapira et al. | |
| 2017/0139483 A1 | 5/2017 | Selker et al. | |
| 2018/0053351 A1 | 2/2018 | Anderson | |
| 2019/0221043 A1 | 7/2019 | Kopper et al. | |

FOREIGN PATENT DOCUMENTS

| | | | |
|---|---|---|---|
| CN | 105739675 A | 7/2016 | |
| DE | 102005027203 A1 * | 12/2006 | ............ G06F 3/016 |
| IN | 106133796 A | 11/2016 | |
| WO | 2017044398 A1 | 3/2017 | |

OTHER PUBLICATIONS

Okamura, M Allison, "Haptic Feedback in Robot-Assisted Minimally Invasive Surgery", Johns Hopkins University Department of Mechanical Engineering Laboratory for Computational Sensing and Robotics 3400 N. Charles St. Baltimore, Maryland, 21218 USA, Jan. 2009, pp. 1-10.

Pacchierotti, Claudio , et al., "Cutaneous Feedback of Fingertip Deformation and Vibration for Palpation in Robotic Surgery", IEEE transactions on bio-medical engineering, DOI: 10.1109/TBME.2015.2455932, Jul. 2015, pp. 1-11.

"Avatar VR", https://avatarvr.es/, accessed Jun. 10, 2019, pp. 1-10.

"Introducing Tactai Touch", https://www.tactai.com/, accessed Jun. 10, 2019, pp. 1-3.

Xu, Xiao , et al., "Point Cloud-Based Model-Mediated Teleoperation With Dynamic and Perception-Based Model Updating", IEEE Transactions on Instrumentation and Measurement, vol. 63, No. 11, Nov. 2014, pp. 2558-2569.

* cited by examiner

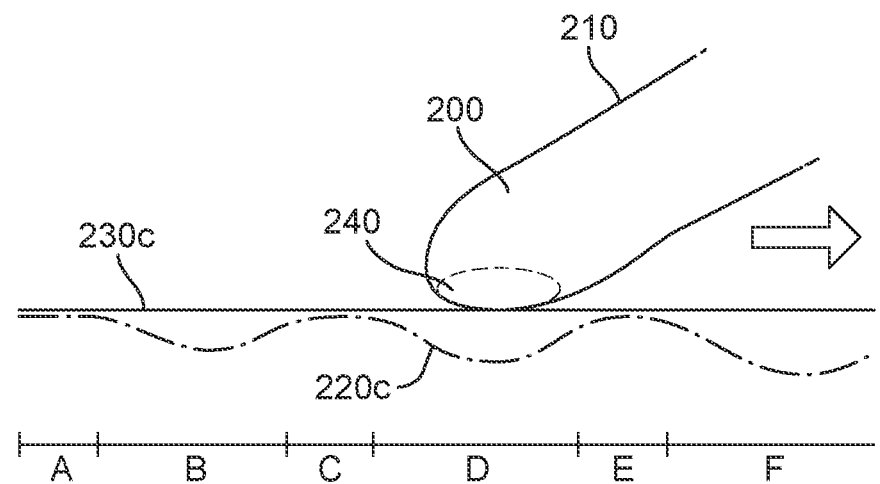
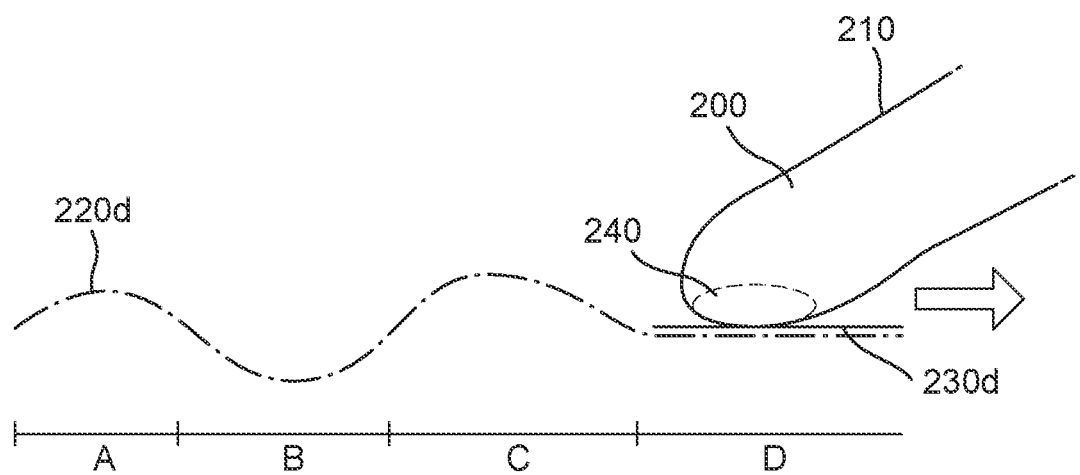

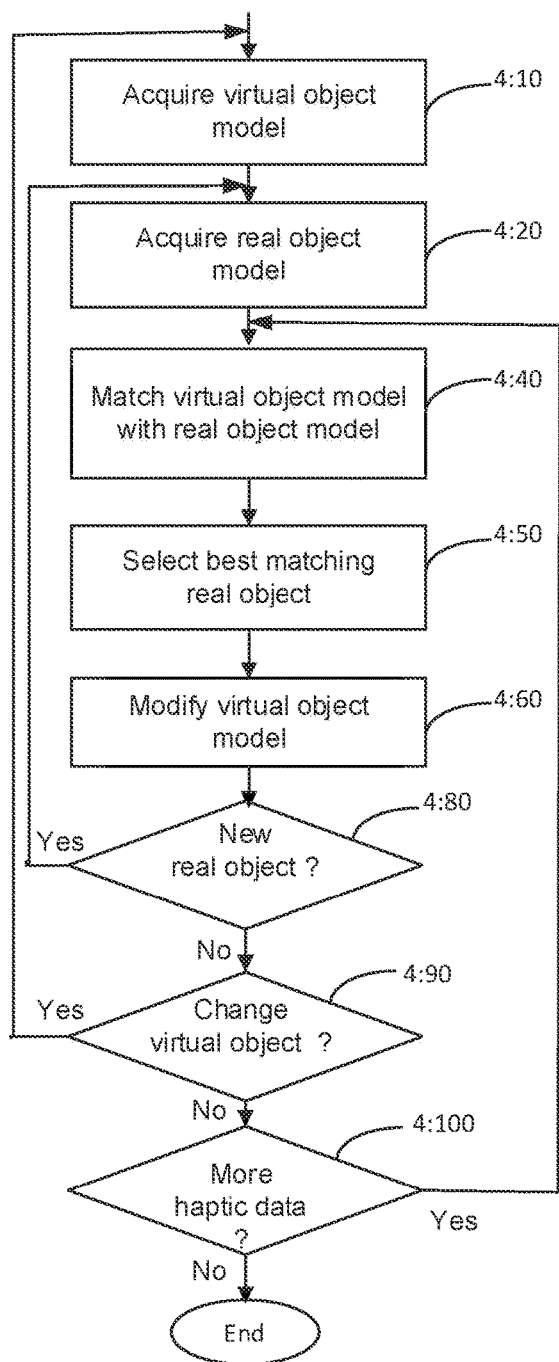
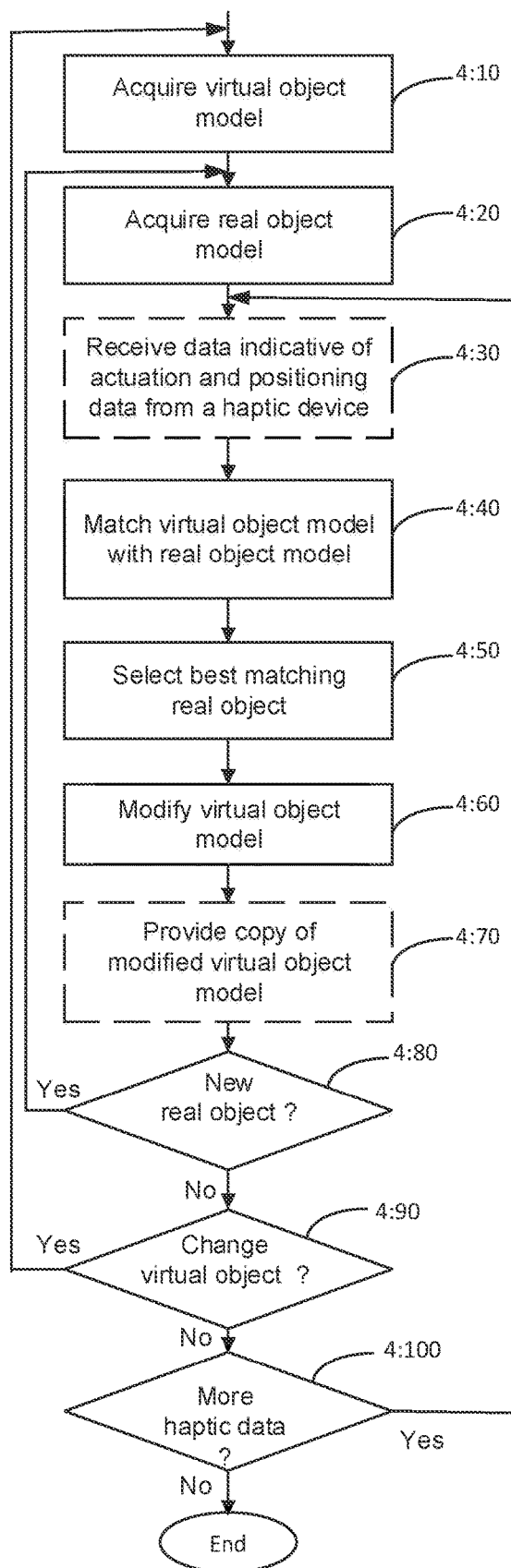
Figure 4a
Figure 4b

METHOD AND ARRANGEMENT FOR HANDLING HAPTIC FEEDBACK

RELATED APPLICATIONS

This application is a continuation of U.S. application Ser. No. 17/499,342 filed 12 Oct. 2021, which is a continuation of U.S. application Ser. No. 16/470,783 filed 18 Jun. 2019, now U.S. Pat. No. 11,204,643 B2, which is a U.S. National Phase application of PCT/EP2016/082183 filed 21 Dec. 2016. The entire contents of each aforementioned application is incorporated herein by reference.

TECHNICAL FIELD

The present disclosure relates to a method and arrangements for handling haptic feedback in a haptic feedback enabled system.

BACKGROUND

The haptic Internet can be seen as a next step towards mobile networking. It is currently possible to communicate efficiently over both voice and video, but in a future networked society it is envisioned that people will be able to also communicate the sense of touch via suitable devices, commonly referred to as haptic devices. In the past years, there has been a large amount of research on devices which allow this type of communication to take place and already today various types of devices exist that provide both mobile and fixed haptic feedback. Mobile haptic devices are particularly relevant for various types of commercial applications, such as e.g., Virtual Reality (VR) and Augmented Reality (AR), where a complete immersion of the user is to be achieved. Haptic technology can be used for robotic surgery, as described e.g., in https://www.ncbi.nlm.nih.gov/pmc/articles/PMC2701448/, referring to Haptic Feedback in Robot-Assisted Minimally Invasive Surgery. A wearable platform for touch-enabled interaction in VR/AR is presented in http://www.tactai.com/, while a haptic glove, enabling feel and touch of a virtual object, when used together with a VR headset, e.g. a HMD or a screen, is described in https://www.neurodigital.es/gloveone/. Moreover, haptic technology becomes more and more common in smartphones, laptops, and other wearables.

Haptic perception can be described as comprising kinaesthetic and tactile sense and presently relates to the sensation of e.g., size, shape, mass, texture, friction, and stiffness objects or materials. Kinaesthetic information refers to the information perceived when moving joints, muscles, and tendons, while tactile information refers to information retrieved via the skin, e.g., via a tactile glove. By utilizing devices with kinaesthetic and/or tactile actuators, a remote operator or user will be able to perceive some or all the above mentioned properties or characteristics in the remote environment. Together with a visual device, a user applying kinaesthetic and/or tactile devices, users are able to get a user experiences involving both sight and touch.

One commercial application of haptics is to allow users to feel different objects/surfaces remotely. Depending on the use-case scenario, objects/surfaces are required to be rendered and displayed in real-time, where the physical and geometric characteristics are acquired by one or multiple sensors, e.g. by taking a photo with a camera and scratching a remotely located object with a smartphone and by acquiring and using signals captured by one of the smartphones sensors, such as an accelerometer, and the camera, to create a haptic model of the object. Objects/surfaces may also be virtual, where their physical and geometric characteristics are stored in one or multiple databases and retrieved by a haptic device and viewed on a visual device on request. The latter type of objects/surfaces may be visualised via a handheld device, such as e.g., a smartphone, directly or may be viewed via any type of 2D or 3D display, including a Head Mounted Display (HMD). A typical use case is that of a user that is interested in buying a product, such as e.g., a furniture, pillow or a tile. The user chooses to not only watch the product remotely via a homepage, but also wants to be able to remotely feel the physical and/or geometrical characteristics of the product, or at least a part of the product, to get a better and more complete impression of the product before making the final decision.

A 3D visual model can typically be constructed from video, captured by a video camera, and depth data, captured by 3D sensors. The captured object is typically stored and displayed as point clouds or meshes. Point cloud models use vertices to describe all the points that compose the cloud, while a mesh is a collection of vertices edges and faces that define the shape of a polyhedral object.

A haptic model is composed by geometrical and physical characteristics of the object, where a geometric component, such as e.g., shape or size, is typically encoded in depth data, captured by 3D sensors, while physical characteristics, such as e.g., stiffness, friction, temperature or texture, are typically defined for each point/surface of the geometric model. The physical properties are typically acquired by suitable sensors, such as e.g., accelerometers, force sensors, position sensors, cameras and spectrometers.

A problem with an arrangement with applying haptic feedback as suggested above, is, however, that it can be difficult to provide haptic feedback of virtual objects from a haptic device in a sufficiently efficient and realistic manner.

Another problem related to haptic feedback is that a virtual object is rendered "in the air", thereby requiring all haptic feedback to be provided by the haptic device. Furthermore, a user rendering a virtual object "in the air" is affected by the so called "gorilla arm syndrome", where the user's arms typically will become tired after a very short time, typically within less than 90 seconds. Hence, there is a need to develop a method which do not require the user to always keep the arms unsupported in the air in order to be able to interact with a virtual object.

SUMMARY

It is an object of the present document to address, or alleviate, at least some of the problems described above.

According to one aspect, a method, for adapting a virtual object model, to be executed at a controller, is suggested. The suggested method comprises acquiring of a virtual object model of a relevant virtual object and of at least one real object model of a relevant real object. In a next step at least a part of the virtual object model is matched to at least a part of one of the at least one real object model, according to at least one matching criteria, after which the best matching real object is selected before at least a part of the virtual object model is modified with respect to the at least part of the selected real object model.

Due to the suggested method, a user does not have to render a virtual object in the air but can render the object in a more relaxed manner, thanks to an assisting real object. Furthermore, actuation of actuators of a haptic device can be reduced, in a real object is used when rendering.

The virtual object model can be acquired from a database of, or accessible to, any of the controller, and a rendering device. Also the at least one real object model can be acquired from a database.

The matching criteria can comprise at least one haptic device characteristics, wherein the haptic device characteristics may be mutually weighted.

According to one embodiment, the matching comprises determining the best match between at least part of the virtual object model and at least part of the at least one real object model by considering at least one of: minimizing the number of actuators of the haptic device that need to be considered; minimizing the energy consumption needed for rendering, with respect to one or more of said haptic device characteristics; maximizing the matching of one or more haptic device characteristics between the real object models and the virtual object model, or determining the real object located closest to the haptic device for which a matching level is obtained.

According to one embodiment, the modification comprises subtracting at least one haptic device characteristics of the real object model from the virtual object model.

According to one embodiment, the method further comprises transmitting, to a rendering device, location dependent information, indicating where on the rendering device to render the modified virtual object model.

According to yet another embodiment, the method comprises the further step of receiving, from a haptic device, data indicating actuation on said real object and a position of actuation on said real object.

According to yet another embodiment, the method comprises the further step of providing a modified copy of the virtual object model to said haptic device.

According to another embodiment, a controller for adapting a virtual object model is suggested, where the controller comprise a processor and a memory, the memory comprising instructions, which when executed by the processor causes the controller to: acquire a virtual object model of a relevant virtual object and at least one real object model of a relevant real object; match, at least a part of the virtual object model to at least a part of one of the at least one real object model, according to at least one matching criteria; select the best matching real object, and modify at least a part of the virtual object model with respect to the at least part of the selected real object model.

Instructions may cause the controller to acquire the virtual object model from a database of, or accessible to, any of the controller, and a rendering device, and may also cause the controller to acquire at least one real object model from a database.

Furthermore, instructions may cause the controller to use at least one haptic device characteristics as matching criteria.

Instructions may cause the controller to consider matching criteria, comprising a plurality of haptic device characteristics, wherein the haptic device characteristics are mutually weighted, while other instructions may cause the controller to execute the matching by determining the best match between at least part of the virtual object model and at least part of the at least one real object model by considering at least one of: minimizing the number of actuators of the haptic device that need to be considered; minimizing the energy consumption needed for rendering, with respect to one or more of said haptic device characteristics; maximizing the matching of one or more haptic device characteristics between the real object models and the virtual object model, or determining the real object located closest to the haptic device for which a matching level is obtained.

According to one embodiment instructions causes the controller to execute the modification by subtracting at least one haptic device characteristics of the real object model from the virtual object model.

According to another embodiment instructions causes the controller to transmit, to a rendering device, location dependent information, indicating where on the rendering device to render the modified virtual object model.

According to one embodiment the controller is receiving data indicating actuation on said real object and a position of actuation on said real object, from a haptic device. The controller may also comprise instructions which causes the controller to provide a modified copy of the virtual object model to the haptic device.

According to another aspect, a controller is suggested for adapting a virtual object model. The suggested controller comprising: a first acquiring module for acquiring a virtual object model of a relevant virtual object; a second acquiring module for acquiring at least one real object model of a relevant real object; a matching module, for matching, according to at least one matching criteria, at least a part of the virtual object model to at least a part of one of the at least one real object model; a selecting module for selecting the best matching real object, and a modifying module for modifying at least a part of the virtual object model with respect to the at least part of the selected real object model.

According to another aspect a computer program is suggested for adapting a virtual object model, where the computer program comprise executable instructions, which when run by a controller causes the controller to: acquire a virtual object model of a relevant virtual object; acquire at least one real object model of a relevant real object; match, according to at least one matching criteria, at least a part of the virtual object model to at least a part of one of the at least one real object model; select the best matching real object, and modify at least a part of the virtual object model with respect to the at least part of the selected real object model.

According to yet another aspect, a computer program product is suggested, which comprise a computer program, such as the one described above, and a computer readable storage medium on which the computer program is stored.

BRIEF DESCRIPTION OF THE DRAWINGS

Embodiments will now be described in more detail in relation to the accompanying drawings, in which:

Embodiments will now be described in more detail in relation to the accompanying drawings, in which:

FIG. 2c is illustrating the users finger actuating on a real object but rendering a second virtual object.

FIG. 2d is illustrating the users finger actuating on a real object but rendering a third virtual object.

FIG. 4a is a flow chart illustrating a method executable on a haptic processing device, according to one embodiment.

FIG. 4b is another flow chart illustrating a method executable on a haptic processing device, according to another embodiment.

DETAILED DESCRIPTION

Briefly described, a method is suggested for providing haptic feedback of virtual objects by combining the sensation provided by one or more haptic actuators actuating on a virtual object "on top of", or with the assistance of, a real object.

More specifically, a user wanting to render a virtual object haptically and visually can, instead of actuating with a haptic device in the free air, select a suitable real object to actuate on. By suitable we here mean an object which have one or more characteristics which is/are similar to, or within a specific interval of, one or more corresponding characteristics of interest during rendering.

By applying a virtual model, from hereinafter referred to a virtual object model, which is representative of the virtual object to be rendered, on a real object model, representative of the selected real object, the haptic device can be instructed to actuate according to the virtual object model, using the real object model as a reference, whereby the virtual object model is being modified based on the real object model in the region where the user is actuating on the real object with a haptic device. By making such a modification, the actuators of the haptic device need to be actuated to a lesser extent, which results in less power consumption at the haptic rendering device. Furthermore, by using a real object as a basis for the actuation, the user will be able to actuate in a more relaxed manner on the real object and will be provided with haptic feedback from real objects instead of emulated haptic feedback, hence improving the user experience. As will be shown below in a number of exemplifying scenarios, geometric characteristics of real objects can be fully or partially utilized as long as a suitable real object is chosen. Although the given examples are limited to making use of geometric characteristics, it is to be understood that use of real objects can improve user experience and/or power consumption efficiency also with respect to other characteristics, including physical properties such as e.g., stiffness, friction or texture.

Figure 1A:
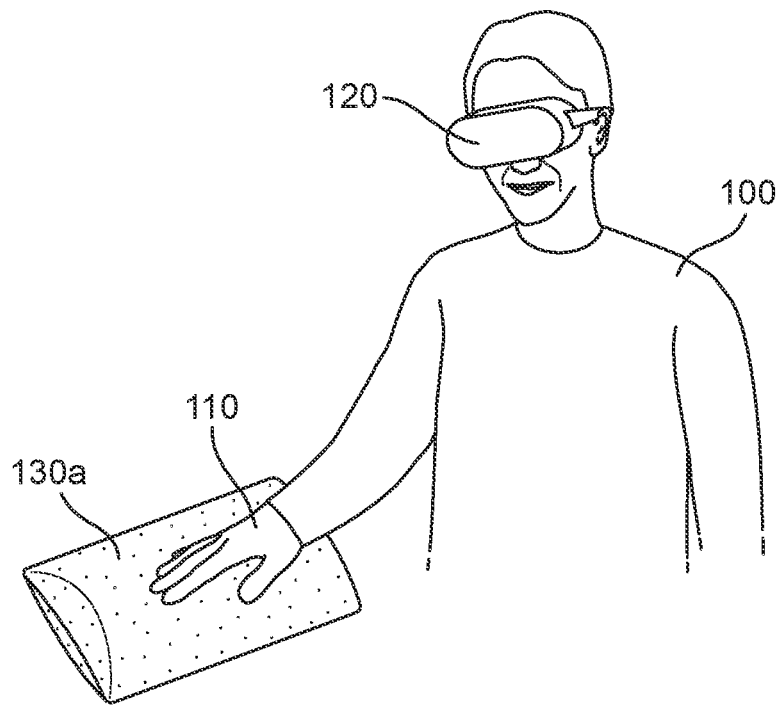
FIG. 1a is an illustration of a user applying haptic feedback on a real object.

FIG. 1a is illustrating a user 100, wearing a visual device, here represented by a Head Mounted Device (HMD) 120, for visually rendering a virtual object (not shown), when actuating on a real object 130a, via a haptic device, here represented by a haptic glove 110 worn by the user 100. While a HMD 120 is used to exemplify the visual device, while a haptic glove 110 is used as a haptic device, it is to be understood that the suggested mechanism can be applied when using any type of visual device, including 2D or 3D devices, which can be used in combination with a haptic device, as well as any type of haptic device, such as e.g. a joystick, which can be used in combination with a visual device, as shown herein. It is also to be understood that this document has a focus on the haptic rendering of a virtual object, whereas the visual rendering, being executed in parallel to the haptic rendering, is executed according to any conventional visual rendering technique, which, as such, is out of scope of this presentation.

As will be covered in further detail below, the real object 130a is to be selected so that it has certain characteristics which are sufficiently similar to the corresponding characteristics of a virtual object of interest, i.e., within a certain range, to be handled by the respective actuator/s of the haptic device 110. Typically, objects located in the vicinity of the user 100 or which can be located by the user 100 in a certain way are registered in a database or any other storage.

Figure 1B:
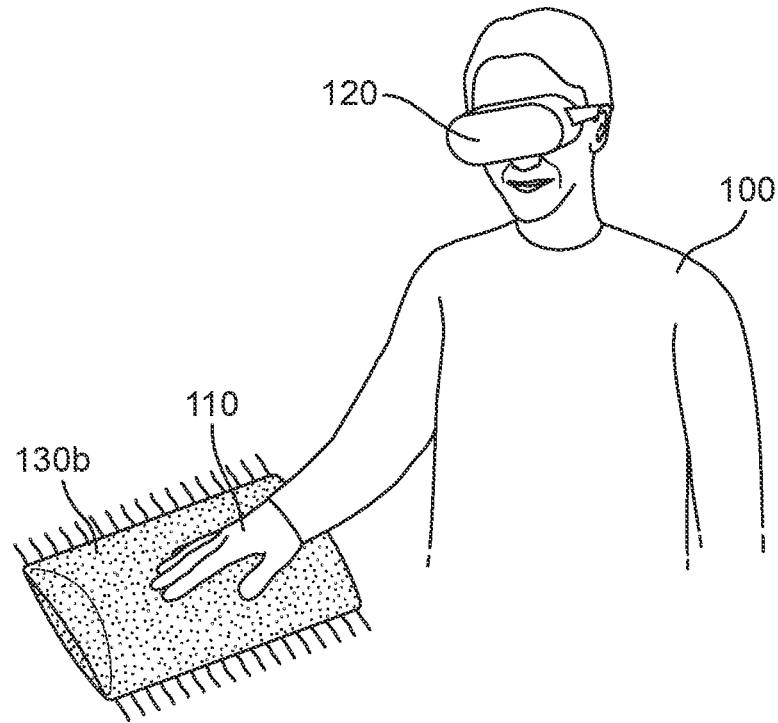
FIG. 1b is an illustration of the same user as in FIG. 1a, where instead of the real object of FIG. 2a, a virtual object as see by the user is presented.

FIG. 1b is illustrating the same user 100 as in FIG. 1a, wearing the same HMD 120 and the same haptic glove 110. However, while the user 100 of FIG. 1a is actuating on the real object 130a, FIG. 1b is illustrating the virtual object 130b which is actually seen by the user 100 via the HMD 120 when actuating on the real object 130a, via the haptic glove 110. It is to be understood that the real object 130a used by the user 100 shall be selected based on characteristics which are relevant for the haptic rendering experience, such that, if e.g. a texture is to be experienced, a real object having at least a region with a similar texture should be chosen, while in case instead the friction of a surface of a virtual object is of interest, the real object to be chosen should have a similar friction. With similar we here mean a property lying within a certain, acceptable range.

By choosing a real object with suitable characteristics, i.e., characteristics which reduces the unpleasant experience of actuating free in the air, as well as the power needed for actuating the haptic glove, not only will the user experience be improved, but also the power consumption will be reduced.

Figure 2A:
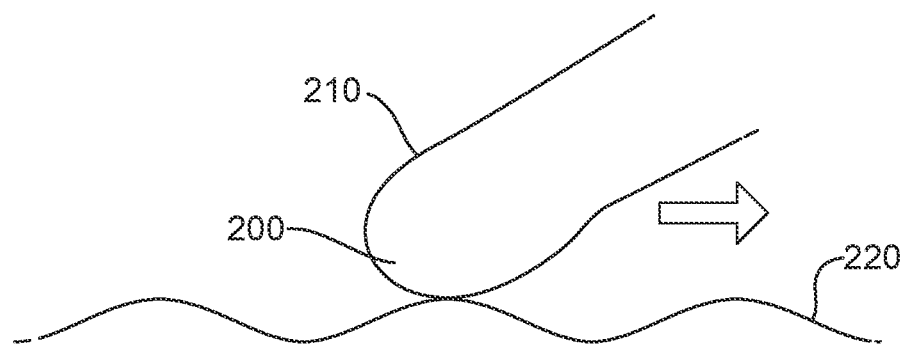
FIG. 2a is illustrating a user's finger when actuating on a real object.

Below, a number of different scenarios, describing how a user may render a surface of an object will be shown, with reference to FIG. 2a-2d, respectively. FIG. 2a is illustrating a user's finger 200, wearing a haptic glove 210, moving over a surface 220 of a real object, in a conventional manner, i.e., without rendering any virtual object. When no haptic functionality is activated in the haptic glove 201, the user, to at least some extent, can feel the shape and texture of the surface 220 through the haptic glove 210.

Figure 2B:
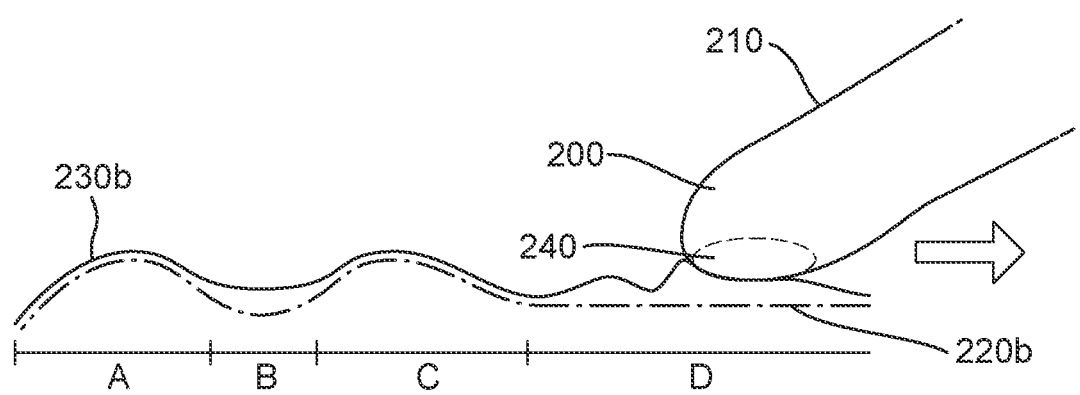
FIG. 2b is illustrating the user's finger when actuating on a real object but rendering a first virtual object.

FIG. 2b is illustrating another scenario, where a user has activated the haptic glove 201, so that the surface of a virtual object can be rendered. The figure is showing a surface of a real object 220b where one or more actuators, here represented by actuator 240, is/are actuating on the user's finger 200 so that, when the user is moving the finger 200 over the surface of a virtual object 230b, making use of a surface of a real object 220b, the two surfaces are basically following each other in regions A-C. At least with respect to shape, the actuator 240 will not need to be actuated in region A and C, while a very moderate actuation is needed in region B. In region D, the real surface 220b goes flat, while the virtual object surface 230b, takes on a more irregular shape, meaning that more, varying actuation is needed by actuator 240. Still, even in region D, the use of the real object 220b will result in that the required actuation of actuator 240 will be less than what would have been the case without use of the real object 220b.

FIG. 2c is illustrating another scenario, where a curved real object surface 220c is used when a user's finger 200 is moved over the real object surface 220c and a flat virtual object surface 230c. This scenario describes how it is possible to switch between using the method suggested herein and rendering in a conventional way. In such a scenario, the activation of the actuator 240 will oscillate depending on the variation between the two surfaces, and the user will experience a very flat, virtual surface, when moving along the curvy real object surface 220c. In the given example, a real object is used when the user's finger is moving over regions A. C and E, while it is assumed that the difference between the virtual object and the real object are too big in the remaining regions, meaning that, in regions B. D and F the haptic glove 210 is used in a conventional way.

FIG. 2*d* is showing yet another scenario, showing that a real object, which to a large extent differs considerably from a virtual object, still can be usable for rendering if a sufficient part of the real object is found to have similar characteristics, i.e., also when only a specific part of the real object needs to be used for rendering. A real object surface 220*d* has a curved shape in region A-C, while the surface is very flat in region D. A virtual object, having surface 230*d* which is very similar in shape to the real object 220*d*, does only exist in region D. Even though the real object 220*d* does not seem to be suitable when actuating on virtual object 230*d* in most of the shown regions, it is very suitable in region D, where minor or no actuation at all is needed.

Figure 3:
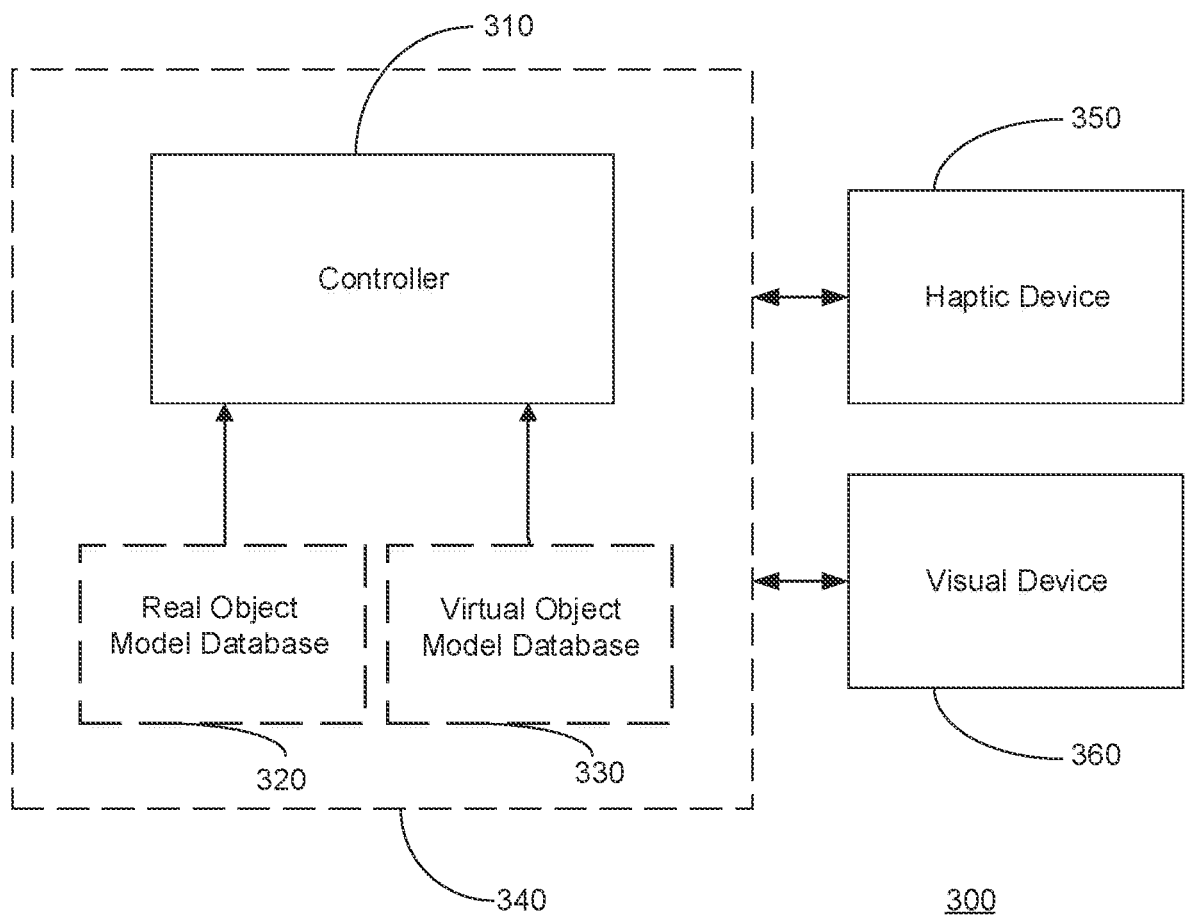
FIG. 3 is a schematic illustration of a system comprising a haptic processing device for handling haptic feedback, a haptic device and a display.

FIG. 3 is a schematic overview of a system 300, configured to execute the mechanism, as described herein, for capturing and processing visual and haptic data. The system 300 comprise a controller 310, which may have access to a first database, here referred to as a real object model database 320, which is storing, models of real objects, from hereinafter referred to as real object models of real objects which can be used when rendering a virtual object with assistance of a real object, and a second database, here referred to as a virtual object model database 330, which is storing virtual object models, available for rendering. Even though illustrated as separate databases 320,330, it is to be understood that, alternatively one single database, or more than two databases, may be used, as long as models of real object, as well as virtual objects, can be accessible by the server 310. Alternatively, relevant data of a real object model and/or a virtual object model is acquired by the controller directly from an application or from the haptic device. In the latter case no real object model database and/or virtual object model database will be required. The complexity of the two mentioned models may vary, both with respect to the detail of description of a complete object, as well as level of detail of different parts of the object.

Typically, the controller 310 and the one or more databases 320,330, if applicable, form part of a server 340, or any other type of network node, capable of providing a mechanism as described herein, is connected to storage means capable of storing the databases if one or both of the mentioned databases are used. The controller 310 is also capable of interacting with a haptic device 350 and a visual device 360, where the visual device comprises a display for visually displaying a virtual object to a user, to retrieve data from one or more databases 320,330 and/or from the haptic 350 and visual device 330 so that visual and haptic information can be rendered accordingly to a user as the user is interacting with a stored virtual object with assistance of a real object. With respect to the visual data, 3D objects can e.g., be stored and rendered as point clouds or as meshes on a 3D display. Point cloud models use vertices to describe all the points that compose a point cloud, while a mesh constitutes a collection of vertices, edges and faces that define the shape of a polyhedral object. Alternatively, the controller 310 form part of the visual device 330 or the haptic device 350. As a further alternative, the mentioned controlling functionality 310 can be distributed over two or more of the server 340, the haptic device 350 and the visual device 360. A real object can e.g., be captured, using a camera of the visual device, after which the real object is identified as a specific real object to which a real object model is accessible to the server.

The haptic device is configured to provide haptic feedback to a user, based on a haptic object model. Such a haptic object model is typically composed of geometric and physical characteristics of a scene, object or plurality of objects, selected by a user. Geometric characteristics, such as e.g., form, size etc., are typically captured by 3D sensors, while physical characteristics, such as e.g., stiffness, texture, friction, force etc., are typically acquired from suitable sensors, such as e.g., accelerometers, force and position sensors, cameras etc.

In addition to the mentioned devices, further devices or functionalities, such as e.g., a graphic user interface, allowing a user to enter options relevant for the described process, are typically included in the system 300. Such functionality can, however, be configured in a conventional manner and is therefore out of the scope of this invention.

A method executable by a processor, such as the one mentioned above, will now be described in further detail with respect to the flow chart of FIG. 4*a*. Typically an application, capable of executing the suggested method, is run on the processor. In a rust step 4:10 of FIG. 4*a*, data of a virtual object model is acquired by the processor. This is typically achieved by a user, browsing on a web page or an application, selecting a virtual object to be rendered. If a real object is to be used when rendering the selected virtual object, also a real object is selected by the user. Alternatively, such a selection is done completely or partly automatically by the processor. By way of example, a user having selected a virtual object may enter one or more characteristics, such as e.g., the texture of a sofa or the friction of a tile, that is/are of particular interest to render through a suitable user interface. Selection of suitable characteristics could also be made semi-automatically, where, based on a choice made by the user, e.g., of a specific part of a virtual object, visually rendered to a user, certain characteristics, which are relevant for that selected part, are chosen automatically. In a next step 4:20, a real object model is acquired. Again, object models of real objects available to the user may be selected manually or provided automatically or semi-automatically to the user, thereby enabling the user or processor, or a combination of both, to select a suitable real object. To aid the user when selecting a real object, the user may have the option to enter characteristics of interest, where these characteristics can be compared to characteristics of real objects, stored in the real object model database or any other data source. Again, any type of conventional user interface can be used for manually entering such options. Once the user has selected a real object or once a real object has been automatically selected, a match between the virtual object model and the selected real object model is executed, as indicated with step 4:40. Such a match will typically include limiting of the virtual object model and real object model to a specific area or region of the two object, in order to provide a correct and advantageous user experience with respect to the selected one or more characteristics. Also, such a limitation could be achieved by way of executing an automatic or semi-automatic procedure. More specifically, a user may, during the mentioned matching procedure, select a certain part of a product for further investigation, or based on user input, the processor may be configured to choose a specific region for which relevant capabilities are advantageous for a positive user experience.

Once the matching has been completed, one or more most preferred real object will be available. In its simplest case, only one real object is available to the user and, in case this object is found to be usable for assisting when rendering the selected virtual object, this real object can be selected, as indicated with step 4:50, while if this is not the case, the user will instead need to render the virtual object without any assistance of any real object, i.e. in a conventional way. Whether or not a real object is usable may depend on issues such as e.g., capabilities of the haptic device, and/or the quality of the data provided to the processor.

In a further step 4:60, the virtual object model is modified with respect to the selected and user real object. During such a modification, one or more characteristics can be weighted higher e.g., if selected previously by the user or the system. The modified virtual object model can now be used for rending the selected virtual object with assistance of the selected real object.

As indicated with step 4:100 in FIG. 4a, the described process is repeated as long as there are more haptic data, together with associated position data. The process may also offer the user to change real object to use during rendering, as indicated with step 4:80 and/or to change virtual object to render, as indicated with step 4:90. As already indicated above, it is also possible to use the suggested method only when certain conditions or criteria for using a real object are fulfilled. Consequently, step 4:50 may comprise the further action of determining whether the selected real object model is usable. If the required conditions are not fulfilled, no modifications of the virtual object model will be executed in step 4:60 and instead the unmodified virtual object model will be applied in a conventional manner. Thereby, the suggested method can be applied when applicable, while it is bypassed in e.g., regions of a real object where the quality of the real object model is below a certain threshold value. Different real objects may also be used for different parts of a virtual object. By way of example, insufficient quality of a real object, or a result from step 4:50 which does not fulfil predefined minimum requirements, may result in that in step 4:90, another, more suitable real object is suggested to the user. After the suggested new real object has been approved by the user, the suggested method can be restarted from step 4:10, using the new real object on the respective section of the virtual object.

FIG. 4b is showing a method for considering a real object when rendering a virtual object according to alternative embodiments. Only the two optional steps 4:30 and 4:70, which differs from FIG. 4a, will be described herein, where one, or both of these optional steps, can be applied. According to step 4:30 of FIG. 4b, data indicative of actuation is received from a haptic device, together with relevant positioning data, indicating the position of the haptic device on the two objects. This is applicable e.g., when only a specific, limited region of the mentioned objects is to be rendered. Furthermore, while a modified virtual object model obtained in step 4:60 can be used in various ways for rendering a virtual object, step 4:70 of FIG. 4b indicates how the modified virtual object model is provided to a haptic device, typically by transmitting this data to the haptic device and the display device.

According to one exemplifying scenario, a user wants to visually and haptically explore a new sofa before deciding whether or not to buy it online. The relevant virtual characteristics of the sofa are therefore retrieved as a part of a virtual object model via an application, running on, or in association with, a visual device, such as e.g., a HMD. The user also is equipped with a haptic device, e.g., one haptic glove or a pair of haptic gloves, which allow the user to feel wanted characteristics of the sofa. The user may be located at home, where a variety of real objects are available and where the respective real object models are stored in a home server or in a database, available to the application. The user may e.g., sit in a sofa not so similar to the one under exploration, while the mentioned sofa, or at least characteristics of the sofa which are of interest to the user, have more in common with a cushion of one of the dining chairs at home. One may e.g., imagine that if the texture of the cushion matches the texture of the virtual object by 90%, such a real object is suitable to be used during rendering. Alternatively, the user may use an application at a fair or temporary exhibition or marketing event, where real objects, specially adapted to provide a good user experience and/or more efficient power consumption, are provided to the user. With a selected virtual object model and real object model, the described method can be executed accordingly.

More specifically, the processor acquires relevant data, which data is used to modify the virtual object model, such that the real object can be used, as described above. This means that the modified virtual object model to be used as input by the rendering device will only indicate the mismatch between the virtual and the real object, instead of completely considering the virtual object model. Since the selected cushion has smaller dimensions than the sofa and is geometrically different, only a limited flat part of the sofa is selected for rendering. This part may e.g., be specifically indicated visually to the user. On top of this adapted haptic feedback, the HDM visually renders the correct colour of the virtual object, in order to allow the user to get the impression that he or she is actually both seeing and touching the virtual sofa, instead of the real cushion available at the user's location.

By utilising a method such as the one described above, the actuation required at the haptic actuators, actuating based on the modified virtual object model, can be reduced, since the haptic actuators will not have to render the complete virtual object texture. In case of the present example with a 90% match, only 10% of the texture of the used cushion will not be present. Furthermore, the user, resting his or her hand on the cushion during rendering, will not go tired in the used arm or arms as soon as would have been the case if rendering free in the air with the haptic device. Also, the user experience is improved, since 90% of the texture felt by the user is a real object texture rather than an emulated texture.

According to one embodiment, the haptic device initially communicates its characteristics, such as e.g., one or more of an indication of available actuators, type of actuators, range of amplitude and/or frequency for texture rendering, range of friction coefficients, range of stiffness coefficients or range of temperature feedback, to the controller. Alternatively, the haptic device may also communicate its battery levels to the processor, which may e.g., be used such that the described process is automatically activated when the battery level is below a certain battery level.

According to another embodiment, the processor specifies only certain specific characteristics to the haptic device, so that only those characteristics are provided to the processor.

The mentioned searching and matching for a suitable real object can be executed with respect to one or more features of characteristics of the two models. Selection of such characteristics may, as already mentioned, be selected by the user, may be pre-defined or may depend on the characteristics of a haptic device used by the user. In the latter case, characteristics to consider may e.g., depend on type of available actuators, current battery level or the impact one or more of the actuators have on the energy consumption of the haptic device during rendering. Characteristics may also be considered as a combination of the mentioned alternatives, such that e.g., some characteristics are automatically chosen by default, enabling the user to make correction to the automatic choice more or less manually.

According to one embodiment, the process mentioned above is performed so that the number of active actuators of the haptic device is minimized, while the matching of the models exceeds a specific threshold level.

According to another embodiment, the selection is made with a focus on minimization of the energy consumption, while the matching of the models exceeds a specific threshold level.

According to yet another embodiment, the focus instead lies on maximizing the matching between one or more selected characteristics.

According to another embodiment, a focus instead lies on the distance of the user and the real objects. By way of example, the real object for which one or more characteristics exceeds a respective threshold, that is located closest to the user is selected. Alternatively, only real objects within reach of the user could be considered.

According to yet another embodiment, a specific characteristics, such as e.g. texture or friction, that is of particular importance for the rendering is selected. Thereby exploration of a selected virtual object can be executed only considering the selected characteristics.

It is to be understood that also a combination of different aspects, such as e.g. the ones suggested above, can be applied, e.g. so that different aspects can be weighted differently, but still considered.

Looking now at the modification procedure, this is a procedure where characteristics of the two mentioned models are compared and where a compensation of relevant characteristics of the virtual object model is executed with reference to the real object model. More specifically, a haptic device may be able to operate within an interval $X \in [Xmin, Xmax]$ of specific characteristics of a selected virtual object, while a real object, available to the user, is able to provide a level Y of that same feature. The actual value to be rendered for the virtual object is here referred to as V. If we assume that the real object cannot modify its characteristics, while the haptic device has a dynamic output level. Hence, the virtual object model will be modified to $V^*=V-Y$, resulting in that the haptic device will be rendering $X=V^*$. Please also note that the mentioned reasoning is only valid for $Y<V$, since the haptic device is normally unable to remove or subtract haptic characteristics but is normally only able to add haptic characteristics on top of the respective real object model characteristics.

In the example mentioned above, the values of the haptic object, as well as the real object characteristics, are assumed to be invariant in space and time. However, these parameters may be space dependent, i.e. $X(p), V(p), Y(p), V^*(p)$, where p disclose 2D or 3D coordinates of an object in space. In other cases, the haptic characteristics may be given by a partial difference equation, such that e.g. $dV(p)/dt=f(p,u)$, where u denotes an input to the function, which may be e.g. user input, such as e.g. user touch speed or force. In this way, the haptic characteristics will behave as a dynamic system, based on the user input. In yet another embodiment, the haptic characteristics are given as a linear or nonlinear function, which may be solely dependent on input, i.e. $V(p)=g(p,u)$, where again u denotes an input function.

For simplicity, and in order to make the presentation generic, the variables X, V, Y and $V^*$ are given without specifying if they are fixed, dynamic and/or space dependent.

Assuming that the selected real object has a certain level of stiffness, which is lower than the one required by the virtual object model, i.e. $Y<V$, the haptic device will be used based on the fact that the user is touching a real object with a certain level of stiffness, wherein additional required stiffness $X=V^*=V-Y$ is added so that the user eventually feels the required stiffness V of the virtual object model.

If removal or subtraction of haptic characteristics is required, e.g. in the situation when all available real objects are stiffer than the virtual object to be rendered, i.e. $Y>V$, in general no real object will be of real use, and instead full use of the haptic device will be required. If, however. $Y<V$ the method suggested herein will yield an improved user experience and will also provide energy savings to the haptic device.

It may occur that at some point or area, p=p' of a virtual object, a removal or subtraction of haptic characteristics $Y(p')>V(p')$ for a matched real object is required. In such a situation execution of the suggested method will be stopped and ordinary execution will instead commence.

According to another, exemplifying embodiment $V^*=V-Y<\epsilon$, where $\epsilon$ is a setup parameter, determining when such haptic characteristics are removed from a virtual object. Such a mechanism may be useful for completely turning off haptic feedback from the haptic device, if the haptic feedback to be provided by the haptic device has a too small amplitude, c, to consider during the modification of the virtual object model. According to another embodiment, the given parameter c is given by human perception limitations, which is defined as a Just Noticeable Difference (JND), and which is documented for several haptic characteristics in the art. In this way, further energy reduction can be performed.

A selected real object may be able to provide a texture, having a high level of matching to the virtual object in the majority of its surface, where $Y \neq 0$, while there may be other areas where there is no matching, or insufficient matching, e.g. since the real object is absolutely flat, i.e. $Y=0$. In the latter situation, the copy of the virtual object model is modified so that the areas corresponding to where the real object is flat contains the required texture, where $X=V^*=V$, since $Y=0$, while the texture is either removed completely from the areas, corresponding to the high level of matching, i.e. $X=V^*=V-Y<\epsilon$, since $V \approx Y$. or an adaption of the mentioned characteristics is performed, as described above. i.e. $X=V^*=V-Y$, since $Y \neq 0$.

According to another example, the real object provides a level Y of friction, here low friction, while the virtual object of interest requires a level $V>Y$ of friction, here higher friction. In such a situation a haptic device will provide additional friction $X=V^*=V-Y$. Similarly, the same principle will be used for providing other characteristics, such as e.g. texture or temperature.

Several technologies are able to provide haptic feedback as described herein with respect to characteristics such as e.g. stiffness, texture, friction, temperature and/or geometric characteristics. Haptic feedback with respect to stiffness can e.g. be obtained via the Phantom Omni, the Exo Glove or NormalTouch. Characteristics, such as friction and texture can e.g. be provided via the previously mentioned devices, as well as with the Tactai Touch or the GloveOne haptic glove device. Haptic temperature related feedback may be provided by temperature actuators, added to the devices mentioned above.

According to one embodiment, the controller contains and loads the real object models of all objects located within a radius, Z, around the user. The user's position is retrieved using sensors placed in the HDM, the haptic device or other devices. In this way, the server is able to perform a better suggestion of which real object the user should interact with.

Figure 5:
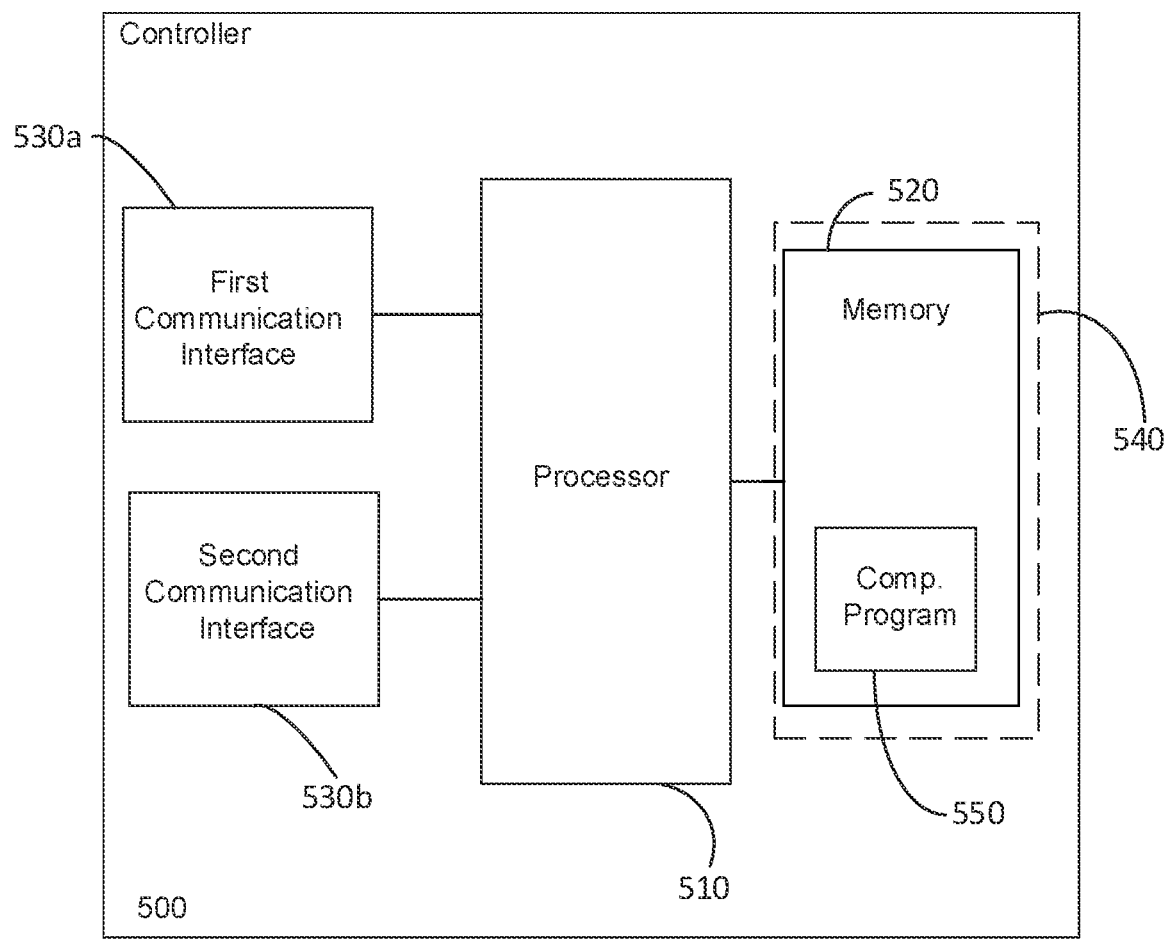
FIG. 5 is a schematic illustration of a haptic processing device according to a first embodiment.
Figure 6:
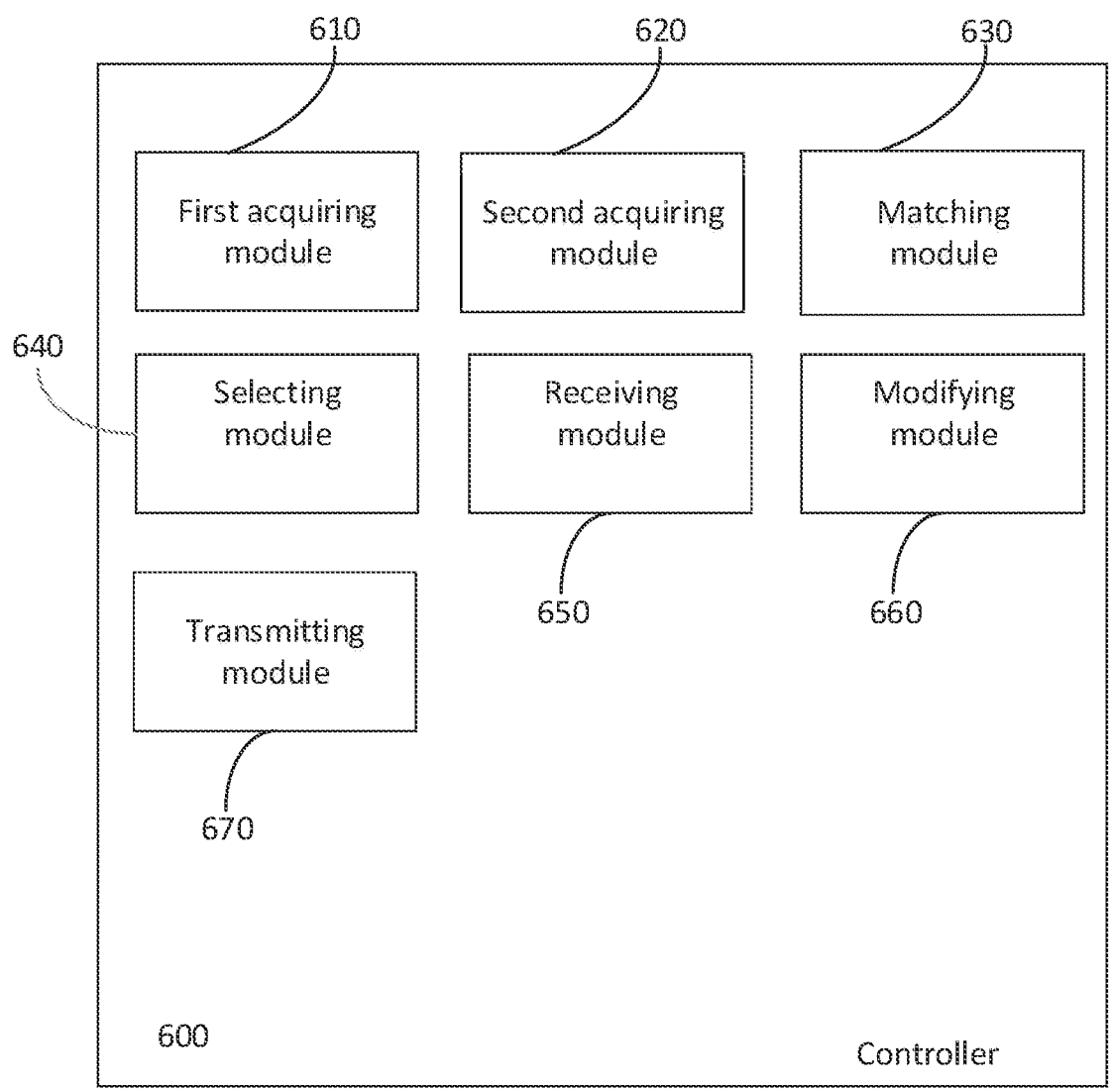
FIG. 6 is a schematic illustration of a haptic processing device according to a second embodiment.

A controller will now be described which is configured to execute the method described above, with reference to FIG. 5. The controller 500 of FIG. 5 comprise at least one processor, here represented by one processor 510, and a memory 520, where the at least one processor 510 is a central processing unit (CPU), multiprocessor, microcontroller, or a digital signal processor (DSP), which is capable of executing instructions, or executable code, stored in the memory 520. Alternatively, the at least one processor 510 may be configured as one or more application specific integrated circuits (ASIC), or as one or more field programmable gate arrays (FPGA). The memory 520 may e.g. comprise magnetic memory, optical memory, solid state memory or even remotely mounted memory. The controller 500, also comprises communication means for enabling communication between the processor 500 and haptic and visual devices (not shown), here illustrated as a first communication interface 530a, e.g. serving as a receiving interface, and a second communication interface 530b, e.g. serving as a transmitting interface. Communication may be provided via any type of conventional wireless or wireline communication, such as e.g. Wifi, Bluetooth and/or cellular communication.

More specifically, when instructions are executed by the processor 510, the processor 510 is configured to cause the controller 500 to acquire a virtual object model of a relevant virtual object, selected by a user, and to acquire at least one real object model of a relevant real object. The real object model can be acquired manually, automatically, or as a combination of both. The processor 510 is also caused to match at least a part of the virtual object model to at least a part of one of the at least one real object model, according to at least one matching criteria. Based on the matching, it is possible to determining whether or not an available real object can be used for assisting rendering of a virtual object. If one or more real objects are considered to be usable, the controller 500 is caused to select the best matching real object. Which real object that is considered to be the best object depends on the criteria which is used in the matching procedure. Next the controller 500 is caused to modify at least a part of the virtual object model with respect to the at least part of the selected real object model.

The controller may be configured to acquire the virtual object model from a database, which may form part of, or be accessible to, the controller or a rendering device, which is in connection with the controller. Also the real object model may be acquired from a database, such as e.g. a real object model database.

The controller 500 may be configured to use haptic device characteristics as matching criteria. According to one alternative embodiment, the applied criteria is mutually weighted, so that criteria can be considered according to its considered relevance.

In order to determine the best match between the two object models, a number of different considerations can be taken, alone or in combination. Such considerations may include e.g. choosing a match which results in a minimizing of the number of actuators of the haptic device that need to be considered. According to an alternative embodiment, instead the energy consumption may be minimized, with respect to one or more haptic device characteristics. According to yet another embodiment, instead a maximizing of a match between one or more haptic device characteristics is decisive, while, according to yet another embodiment, the distance between the haptic device and the real objects is considered so that, e.g. the closest located object, fulfilling at least a minimum requirement is selected.

The controller is configured to modify the virtual object model according to the applied criteria, so that actual actuation needed by a haptic device is reduced with respect to a real object model, whenever a real object is considered to be useful. According to one embodiment, the controller is configured to execute such a modification by subtracting haptic device characteristics of the real object model from the virtual object model. Once the modification has been executed, the controller will be able to participate in the rendering of the virtual object e.g. by applying the modified model on a rendering device. This can e.g. be achieved by providing or transmitting the modified virtual object model to a haptic device. If the controller receives data, indicating actuation on a real object, together with positioning data, indicating the position of the actuation on the real object, such information will be modified as described above, so that rendering can be compensated for, accordingly.

The controller mentioned above can alternatively be described as constituting a plurality of interacting modules, where these modules may be configured as software related modules, hardware related modules, or as a combination of both. More specifically, a first acquiring module 610 is configured to acquire a virtual object model, corresponding to step 4:10 of FIGS. 4a and 4b, while a second acquiring module 620 is configured to acquire a real object model, corresponding to step 4:20 of FIGS. 4a and 4b. A matching module 630 is configured to match the acquired virtual object model with the acquired real object model, corresponding to step 4:40 of FIGS. 4a and 4b. A selecting module 640, is configured to select a best matching real object, based on the applied selection criteria, corresponding to step 4:50 of FIGS. 4a and 4b. Furthermore, a modifying module 660 is configured to modify the virtual object model, which also comprise a receiving module 650, configured to receive data from rendering devices, and possibly also configured to receive data indicative of actuation and positioning data from a haptic device, so that such data can be matched accordingly, corresponding to step 4:30 of FIG. 4b. Furthermore, the controller 600 comprises a transmitting module 670, configured to transmit data to rendering devices, which may include transmission of modified virtual object model to the haptic device.

A computer program 530 comprising executable instructions, which when run by a controller 500 causes the controller 500 to execute the functionality as described above is also suggested. Such a computer program 530 is provided as a computer program product 540 on which the mentioned computer program 530 is stored, and may e.g. be provided in the form of an optical disc, such as e.g. a Compact Disc (CD), a Digital Versatile Disc (DVD) or a Blu-Ray disc. The computer program product 540 can alternatively be provided as a memory, such as e.g. a random access memory (RAM), a read-only memory (ROM), an erasable programmable read-only memory (EPROM), or an electrically erasable programmable read-only memory (EEPROM) and more particularly as a non-volatile storage medium of a device in an external memory, such as e.g. a USB (Universal Serial Bus) memory or a Flash memory, such as e.g. a compact Flash memory.

It is to be understood that the choice of interacting modules, are only for exemplifying purpose, and, therefore, that modules suitable to execute any of the methods described above may be configured in a plurality of alternative ways in order to be able to execute the suggested procedure actions.

What is claimed is:

1. A method of performing assisted haptic rendering of a virtual object, the method comprising:
   acquiring a virtual object model representing a virtual object having a physical or geometric characteristic to be rendered haptically via one or more haptic actuators of the haptic device;
   acquiring a real object model representing a real object having one or more surface regions to be used for assisting the haptic rendering of the physical or geometric characteristic via the one or more haptic actuators of the haptic device; and
   modifying the virtual object model according to differences between the virtual and real object models relevant to the haptic rendering of the physical or geometric characteristic of the virtual object on the one or more surface regions of the real object; and
   controlling the one or more haptic actuators of the haptic device according to the modified virtual object model, as the haptic device is moved over the one or more surface regions of the real object.

2. The method according to claim 1, wherein acquiring the real object model comprises selecting one from among a database of real object models corresponding to respective real objects.

3. The method according to claim 2, further comprising registering individual ones of the real object models in the database responsive to input by a user to a controller included in or communicatively coupled to the haptic device, or responsive to detection by the controller of corresponding real objects within a vicinity of the user.

4. The method according to claim 1, wherein acquiring the real object model comprises selecting the real object model from among two or more real object models corresponding to respective real objects that are available for the assisted haptic rendering.

5. The method according to claim 4, wherein selecting the real object model from among the two or more real object models comprises determining which corresponding real object has one or more regions that best match the physical or geometric characteristic to be haptically rendered.

6. The method according to claim 1, wherein the physical or geometric characteristic to be haptically rendered is a virtual surface contour indicated by first information contained in the virtual object model, wherein second information contained in the real object model indicates an actual surface contour of the real object in the one or more regions to be used for assisting the haptic rendering of the virtual surface contour, and wherein modifying the virtual object model comprises compensating the first information according to the second information, to account for differences between the virtual surface contour and the actual surface contour.

7. The method according to claim 6, wherein controlling the one or more haptic actuators of the haptic device according to the modified virtual object model comprises controlling the one or more haptic actuators responsive to movement of the one or more haptic actuators along the surface of the real object.

8. The method according to claim 1, wherein the physical or geometric characteristic to be haptically rendered is a virtual texture indicated by first information contained in the virtual object model, wherein second information contained in the real object model indicates an actual texture of the real object in the one or more regions to be used for assisting the haptic rendering of the virtual surface contour, and wherein modifying the virtual object model comprises compensating the first information according to the second information, to account for differences between the virtual texture and the actual texture.

9. A haptic device configured to perform assisted haptic rendering of a virtual object, the haptic device comprising:
   one or more haptic actuators; and
   a controller configured to:
      acquire a virtual object model representing a virtual object having a physical or geometric characteristic to be rendered haptically via the one or more haptic actuators;
      acquire a real object model representing a real object having one or more surface regions to be used for assisting the haptic rendering of the physical or geometric characteristic via the one or more haptic actuators; and
      modify the virtual object model according to differences between the virtual and real object models relevant to the haptic rendering of the physical or geometric characteristic of the virtual object on the one or more surface regions of the real object; and
      control the one or more haptic actuators of the haptic device according to the modified virtual object model, as the haptic device is moved over the one or more surface regions of the real object.

10. The haptic device according to claim 9, wherein, for acquiring the real object model, the controller is configured to select one from among a database of real object models corresponding to respective real objects.

11. The haptic device according to claim 10, wherein the controller is configured to register individual ones of the real object models in the database responsive to input by a user to the controller, or responsive to detection by the controller of corresponding real objects within a vicinity of the user.

12. The haptic device according to claim 9, wherein, for acquiring the real object model, the controller is configured to select the real object model from among two or more real object models corresponding to respective real objects that are available for the assisted haptic rendering.

13. The haptic device according to claim 12, wherein, for selecting the real object model from among the two or more real object models, the controller is configured to determine which corresponding real object has one or more regions that best match the physical or geometric characteristic to be haptically rendered.

14. The haptic device according to claim 9, wherein the physical or geometric characteristic to be haptically rendered is a virtual surface contour indicated by first information contained in the virtual object model, wherein second information contained in the real object model indicates an actual surface contour of the real object in the one or more regions to be used for assisting the haptic rendering of the virtual surface contour, and wherein the controller is configured to modify the virtual object model by compensating the first information according to the second information, to account for differences between the virtual surface contour and the actual surface contour.

15. The haptic device according to claim 14, wherein, as part of controlling the one or more haptic actuators of the haptic device according to the modified virtual object model, the controller is configured to control the one or more haptic actuators responsive to movement of the one or more haptic actuators along the surface of the real object.

16. The haptic device according to claim 9, wherein the physical or geometric characteristic to be haptically rendered is a virtual texture indicated by first information contained in the virtual object model, wherein second information contained in the real object model indicates an actual texture of the real object in the one or more regions to be used for assisting the haptic rendering of the virtual surface contour, and wherein the controller is configured to modify the virtual object model by compensating the first haptic information according to the second information, to account for differences between the virtual texture and the actual texture.

\* \* \* \* \*